US012320133B2

(12) United States Patent
Melton et al.

(10) Patent No.: US 12,320,133 B2
(45) Date of Patent: Jun. 3, 2025

(54) STAIRWAY WORK PLATFORM AND METHOD

(71) Applicant: Werner Co., Greenville, PA (US)

(72) Inventors: Michael Melton, Glen Ellyn, IL (US); David Pozgay, Wilmette, IL (US); Jerry Lauricella, Schiller Park, IL (US)

(73) Assignee: Werner Co., Itasca, IL (US)

( * ) Notice: Subject to any disclaimer, the term of this patent is extended or adjusted under 35 U.S.C. 154(b) by 276 days.

(21) Appl. No.: 17/362,901

(22) Filed: Jun. 29, 2021

(65) Prior Publication Data

US 2022/0003008 A1 Jan. 6, 2022

Related U.S. Application Data

(60) Provisional application No. 63/047,437, filed on Jul. 2, 2020.

(51) Int. Cl.
*E04G 1/30* (2006.01)
*E04G 1/36* (2006.01)
(Continued)

(52) U.S. Cl.
CPC ............... *E04G 1/30* (2013.01); *E04G 1/365* (2013.01); *E06C 1/39* (2013.01); *E06C 1/393* (2013.01)

(58) Field of Classification Search
CPC ....... E04G 1/30; E04G 5/10; E04G 2001/305; E04G 1/28; E04G 1/365; E06C 7/00; E06C 1/39; E06C 1/34; E06C 1/30; E06C 1/393
See application file for complete search history.

(56) References Cited

U.S. PATENT DOCUMENTS 1,359,297 A 11/1920 Voss
1,359,452 A 11/1920 Walker
(Continued)

FOREIGN PATENT DOCUMENTS

CN 105201192 12/2015
CN 107214677 9/2017
(Continued)

OTHER PUBLICATIONS

KR-20060071682-A English translation (Year: 2006).*
(Continued)

*Primary Examiner* — Andrew J Triggs
(74) *Attorney, Agent, or Firm* — Fitch, Even, Tabin & Flannery LLP

(57) ABSTRACT

A stairway work platform for a user includes a plank, a first leg assembly attached in proximity to a first end of the plank. The work platform includes an end pad directly attached to the first end of the plank which prevents damage to a vertical rise area of the stairway. The work platform includes a first bottom pad directly attached to a front of a first leg of the first leg assembly which prevents damage to a horizontal run area of the stairway while supporting a weight of the user. The work platform includes a second bottom pad directly attached to a front of a second leg of the first leg assembly which prevents damage to the horizontal run area of the stairway while supporting the weight of the user. The work platform includes a hinge bracket attached to the plank in proximity to the first end of the plank and to the first leg of the first leg assembly. In a stairway mode, the first leg assembly is in the closed position and is adapted to be disposed on a stair of the stairway and a second leg assembly is extended to a position which makes the plank level with respect to ground. A method for using a work platform. An end pad. A side-bottom pad.

28 Claims, 9 Drawing Sheets

(51) Int. Cl.
*E06C 1/39* (2006.01)
*E06C 1/393* (2006.01)

(56) References Cited

U.S. PATENT DOCUMENTS

| | | | | |
|---|---|---|---|---|
| 1,377,095 | A | 5/1921 | Rupp | |
| 2,186,484 | A | 1/1940 | Gunther | |
| 2,546,387 | A | 3/1951 | Coffing | |
| 2,729,516 | A | 1/1956 | Colvin | |
| 3,128,842 | A | 4/1964 | Satrum | |
| 3,692,143 | A | 9/1972 | Kummerlin | |
| 3,730,465 | A | 5/1973 | Gonzalez | |
| 5,067,589 | A | 11/1991 | Bartnicki | |
| 6,892,860 | B2 | 5/2005 | Gibson | |
| 8,042,653 | B2 | 10/2011 | Grebinoski | |
| D776,826 | S * | 1/2017 | Foley | E04G 1/34 D25/66 |
| 9,752,334 | B2 * | 9/2017 | Foley | E04G 1/34 |
| 9,986,831 | B2 * | 6/2018 | Smith | F16F 1/44 |
| 10,612,304 | B2 * | 4/2020 | Fischer | E04G 1/30 |
| 10,801,219 | B2 * | 10/2020 | Parker | E04G 1/30 |
| 12,077,970 | B2 | 9/2024 | Parker | |
| 2002/0189902 | A1 * | 12/2002 | Nelson | E06C 7/00 182/129 |
| 2007/0074932 | A1 * | 4/2007 | Mutscheller | E06C 7/00 182/107 |
| 2017/0275897 | A1 | 9/2017 | Weadward | |
| 2017/0275899 | A1 | 9/2017 | Woodward | |
| 2017/0334059 | A1 * | 11/2017 | Moffat | A47C 16/04 |
| 2018/0171648 | A1 | 6/2018 | Woodward | |
| 2019/0226217 | A1 * | 7/2019 | Foley | E04G 1/34 |
| 2021/0087882 | A1 * | 3/2021 | Waddell | E06C 7/00 |
| 2021/0164243 | A1 * | 6/2021 | Foley | E04G 1/32 |
| 2022/0282501 | A1 | 9/2022 | Chen | |

FOREIGN PATENT DOCUMENTS

| | | | | |
|---|---|---|---|---|
| EP | 1574636 | | 9/2005 | |
| EP | 2287106 | A2 * | 2/2011 | B66F 11/04 |
| EP | 3372751 | | 9/2018 | |
| FR | 2890677 | | 3/2007 | |
| FR | 2914338 | | 10/2008 | |
| FR | 2975116 | | 11/2012 | |
| JP | 2004068436 | | 3/2004 | |
| JP | 2004068436 | A | 3/2004 | |
| JP | 2018178390 | | 11/2018 | |
| JP | 2018178390 | A * | 11/2018 | E04G 1/34 |
| JP | 2020002651 | A | 1/2020 | |
| KR | 20060071682 | | 6/2006 | |
| KR | 20060071682 | A * | 6/2006 | E04G 1/32 |
| WO | 2007132148 | | 11/2007 | |

OTHER PUBLICATIONS

JP2018178390A English translation (Year: 2018).*
EP 2287106 English translation (Year: 2011).*
Extended European Search Report issued in App. No. EP24156673.6, dated Apr. 22, 2024, 6 pages.
Extended European Search Report issued in App. No. EP24204664, dated Jan. 20, 2025, 9 pages.

* cited by examiner

OPEN POSITION

DETAIL A
SCALE 1 : 5

24
52
70
71
72
73
74
76

STAIRWAY WORK PLATFORM AND METHOD

CROSS-REFERENCE TO RELATED APPLICATIONS

This is a nonprovisional of U.S. provisional application No. 63/047,437 filed Jul. 2, 2020, incorporated by reference herein.

FIELD OF THE INVENTION

The present invention pertains to a work platform that is used in conjunction with a stairway to access areas above the stairway. (As used herein, references to the "present invention" or "invention" relate to exemplary embodiments and not necessarily to every embodiment encompassed by the appended claims.) More specifically, the present invention pertains to a work platform that is used in conjunction with a stairway to access areas above the stairway where the work platform has pads to protect horizontal run area of the stairway upon which one end of the work platform is positioned from marring, scratching or damage.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Accessing areas above a stairway to paint walls, place wallpaper, repair damage, add fixtures or replace light poles can be somewhat precarious since the stairs of the stairway are at different levels, making standard work platforms or ladders unusable or difficult to safely use. This is because the support surface under the area to be accessed above the stairway typically is not level for the opposing rails or leg assemblies to rest on. Consequently, one rail of the ladder may be positioned outside of the step of the stairway when the ladder is leaned against the wall directly above the stairway, so the one rail has nothing to rest on, or if a work platform is used, one leg assembly of the work platform rests on a stair that is at a different height than the other leg assembly of the work platform rests on. The platform itself then forms an angle relative to ground which is unsafe for a worker to work from.

Furthermore, when ladders were work platforms or even to be considered to be used on a stairway, the horizontal run area and vertical rise area of the stairway that are exposed to the rails of a ladder or leg assemblies of a work platform by the rails or the leg assemblies contacting the horizontal run area or vertical rise area, need to be protected from scratching, marring or damage by the ladder or leg assemblies. The protection itself should not and to the risk of slippage, movement, or sliding of the rails or leg assemblies, which could happen for instance if some form of tarp or cloth is placed over the stairway to protect the stairway. Rubber mats can be used, but they typically are not of a size that conveniently fits onto the horizontal run area and vertical rise area on and about the stairway, possibly creating an additional hazard. In such a circumstance, the rubber mats can be cut to size, but then are commonly discarded after the job is completed. What is needed is some type of a work platform that can be positioned level relative to ground on a stairway and which does not damage the vertical rise area and horizontal run area areas with respect to the stairway, and provides resistance to slippage or movement by the work platform.

BRIEF SUMMARY OF THE INVENTION

The present invention pertains to a stairway work platform for a user. The work platform comprises a plank. The work platform comprises a first leg assembly attached in proximity to a first end of the plank. The first leg assembly having a first leg and a second leg opposing the first leg, and a step attached to the first and second legs. The work platform comprises an end pad directly attached to the first end of the plank which prevents damage to a vertical rise area of the stairway. The work platform comprises a first bottom pad directly attached to a front of the first leg which prevents damage to a horizontal run area of the stairway while supporting a weight of the user. The work platform comprises a second bottom pad directly attached to a front of the second leg which prevents damage to the horizontal run area of the stairway while supporting the weight of the user. The work platform comprises a second leg assembly attached in proximity to a second end of the plank. The work platform comprises a hinge bracket attached to the plank in proximity to the first end of the plank and to the first leg of the first leg assembly. The first leg rotating relative to the plank with the hinge bracket between a closed position where the first leg is parallel with the plank, and an open position where the plank is supported by the first and second leg assemblies and the first leg forms an angle between 90 degrees and 145 degrees with the plank. In a stairway mode, the first leg assembly is in the closed position and is adapted to be disposed on a stair of the stairway and the second leg assembly is extended to a position which makes the plank level with respect to ground.

The present invention pertains to a method for using a work platform. The method comprises the steps of placing a first leg assembly in a closed position with a plank, where a first and second leg of the first leg assembly are parallel with the plank, onto a horizontal run area of a stairway. The platform having an end pad directly attached to a first end of the plank which prevents damage to a vertical rise area of the stairway. The first leg having a first bottom pad directly attached to a front of the first leg which prevents damage to the horizontal run area of the stairway while supporting a weight of the user. The second leg having a second bottom pad directly attached to a front of the second leg which prevents damage to the horizontal run area of the stairway while supporting the weight of the user. There is the step of moving a second leg assembly to an extended position which makes the plank level with respect to ground.

The present invention pertains to a leg pad for a work platform. The leg pad comprises a first side pad. The leg pad comprises a first bottom pad extending perpendicularly from the first side pad. The leg pad comprises a first inside pad extending perpendicularly from the first side pad, with the first side pad between the first bottom pad and the first inside pad and the first bottom pad in parallel with the first inside pad.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1A:
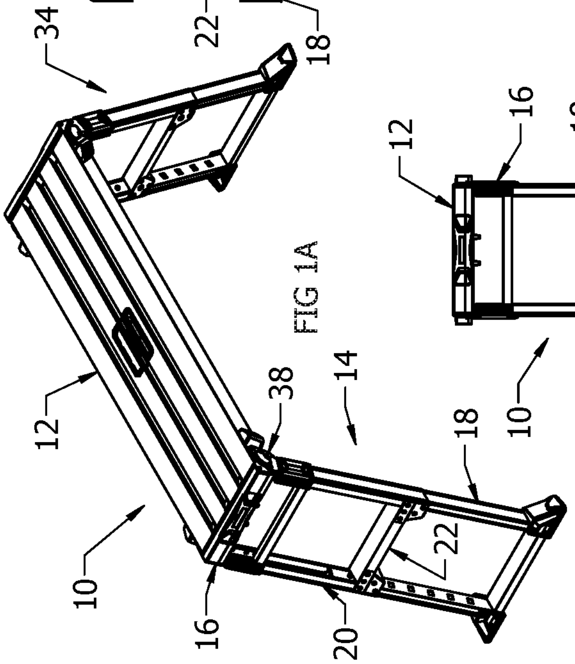
FIGS. 1A-1D show the work platform with the leg assemblies in the fully open position.
Figure 1B:
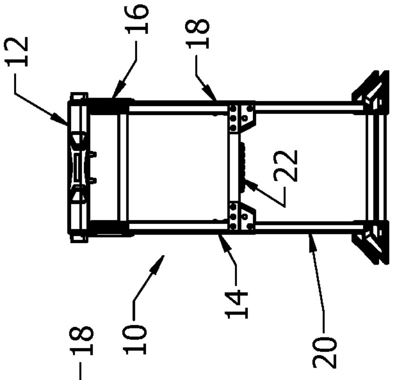
Figure 1C:
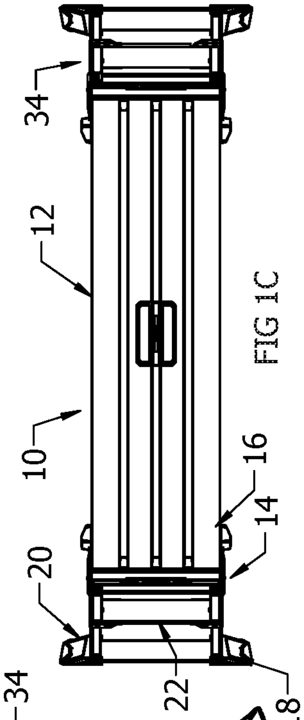
Figure 1D:
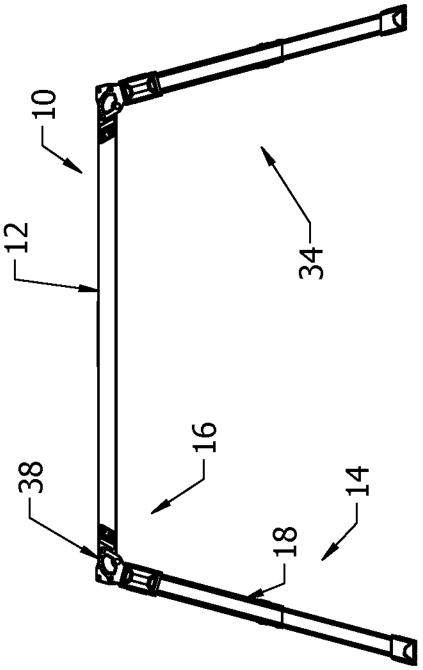
Figure 2:
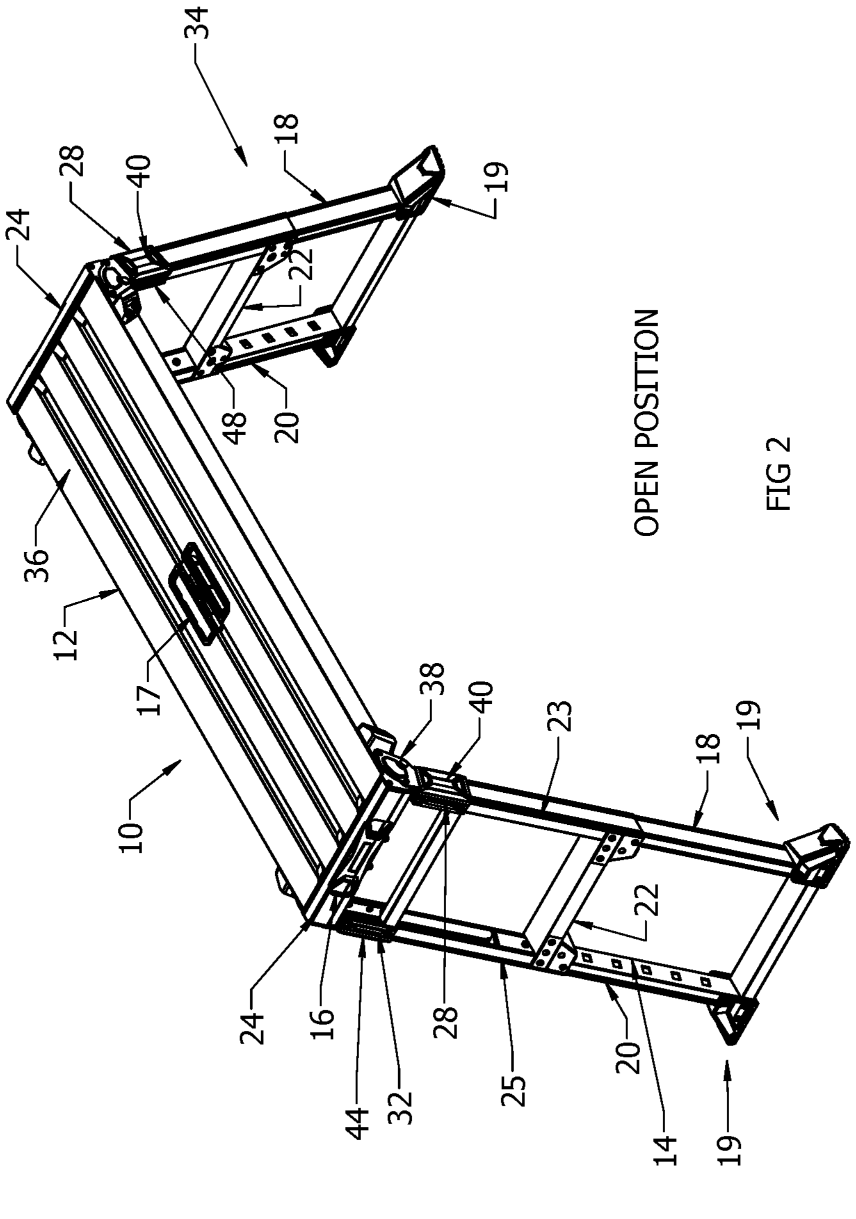
FIG. 2 shows the location of pads on the work platform.
Figure 3:
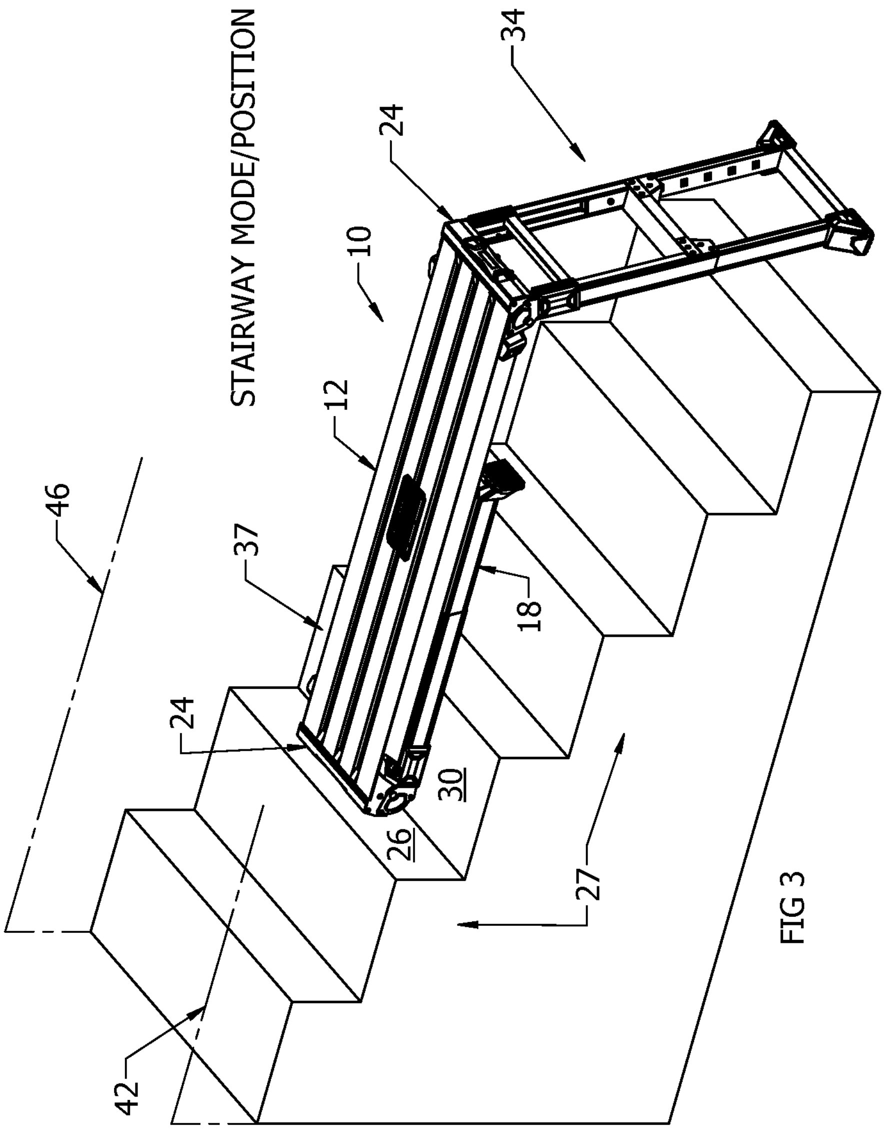
FIG. 3 shows the work platform in stairway mode.

Referring now to the drawings wherein like reference numerals refer to similar or identical parts throughout the several views, and more specifically to FIGS. 1A-1D, 2 and 3 thereof, there is shown a stairway work platform 10 for a user. The work platform 10 comprises a plank 12. The work platform 10 comprises a first leg assembly 14 attached in proximity to a first end 16 of the plank 12. The first leg assembly 14 having a first leg 18 and a second leg 20 opposing the first leg 18, and a step 22 attached to the first and second legs 18, 20. The work platform 10 comprises an end pad 24 directly attached to the first end 16 of the plank 12 which prevents damage to a vertical rise area 26 of the stairway 27. The work platform 10 comprises a first bottom pad 40 directly attached to a front 23 of the first leg 18 which prevents damage to a horizontal run area 30 of the stairway 27 while supporting a weight of the user. The work platform 10 comprises a second bottom pad 32 directly attached to a front 25 of the second leg 20 which prevents damage to the horizontal run area 30 of the stairway 27 while supporting the weight of the user. The work platform 10 comprises a second leg assembly 34 attached in proximity to a second end 36 of the plank 12. The work platform 10 comprises a hinge bracket 38 attached to the plank 12 in proximity to the first end 16 of the plank 12 and to the first leg 18 of the first leg assembly 14. The first leg 18 rotating relative to the plank 12 with the hinge bracket 38 between a closed position where the first leg 18 is parallel with the plank 12, and an open position where the plank 12 is supported by the first and second leg assemblies 14, 34 and the first leg 18 forms an angle between 90 degrees and 145 degrees with the plank 12. In a stairway 27 mode, the first leg assembly 14 is in the closed position and is adapted to be disposed on a stair 37 of the stairway 27 and the second leg assembly 34 is extended to a position which makes the plank 12 level with respect to ground, as shown in FIG. 3.

The stairway work platform 10 may include a first side pad 40 directly attached to a side of the first leg 18 which prevents damage to a right wall 42 which is adjacent to the stairway 27, and a second side pad 44 directly attached to a side of the second leg 20 which prevents damage to a left wall 46 which is adjacent to the stairway 27 when the platform 10 is in the stairway 27 mode. The first side pad 40 and the first bottom pad 28 may be one continuous piece and the second side pad 44 and the second bottom pad 32 may be one continuous piece. The first side pad 40 and the first bottom pad 28, and the second side pad 44 and the second bottom pad 32 may be made of a material that is softer than a material of the stairwell and the material of the first wall and the second wall so the first side pad 40 and the first bottom pad 28, and the second side pad 44 and the second bottom pad 32 do not mar or scratch or damage the stairway 27 or the first wall and the second wall when the platform 10 is in the stairway 27 mode.

The first side pad 40 and the first bottom pad 28, and the second side pad 44 and the second bottom pad 32 may have an L-shaped cross section, which covers the bottom and the right side and the bottom and the left side of the first leg 18 and the second leg 20, respectively. The stairway work platform 10 may include a first inside pad 48 connected to and extending from the first side pad 28 with the first inside pad 48 and the first bottom pad 28 and the first side pad 40 having a C-shaped cross-section and being one continuous piece. The stairway work platform 10 may include a second inside pad 50 connected to and extending from the second side pad 44 with the second inside pad 50 and the second bottom pad 32 and the second side pad 44 having a C-shaped cross-section and being one continuous piece. The second leg assembly 34 may be configured like the first leg assembly 14, with the second leg assembly 34 having a first leg 18 and a second leg 20 and a step 22. Similar to the first leg assembly 14, there may be an end pad 24 at the second end 36 of the plank 12; a first side pad 40, a first bottom pad 28 and a first inside pad 48 directly attached adjacent to the top of the first leg 18 of the second leg assembly 34; and a second side pad 44, the second bottom pad 32 and a second inside pad 50 directly attached adjacent to the top of the second leg 20 of the leg assembly.

The present invention pertains to a method for using a work platform 10. The method comprises the steps of placing a first leg assembly 14 in a closed position with a plank 12, where a first and second leg 18, 20 of the first leg assembly 14 are coplanar with the plank 12, onto a horizontal run area 30 of a stairway 27. The platform 10 having an end pad 24 directly attached to a first end of the plank 12 which prevents damage to a vertical rise area 26 of the stairway 27. The first leg 18 having a first bottom pad 28 directly attached to a front 23 of the first leg 18 which prevents damage to the horizontal run area 30 of the stairway 27 while supporting a weight of the user. The second leg 20 having a second bottom pad 32 directly attached to a front 25 of the second leg 20 which prevents damage to the horizontal run area 30 of the stairway 27 while supporting the weight of the user. There is the step of moving a second leg assembly 34 to an extended position which makes the plank 12 level with respect to ground.

The present invention pertains to a leg pad 41 for a work platform 10, as shown in FIGS. 5A-5D. The leg pad 41 comprises a first side pad 40. The leg pad 41 comprises a first bottom pad 28 extending perpendicularly from the first side pad 40. The leg pad 41 comprises a first inside pad 48 extending perpendicularly from the first side pad 40, with the first side pad 40 between the first bottom pad 28 and the first inside pad 48 and the first bottom pad 28 in parallel with the first inside pad 48.

The present invention pertains to an end pad 24, as shown in FIGS. 6A-6D. The end pad 24 can have a C-shaped cross-section that is one continuous piece, formed of a center pad 70 which is positioned over the center of the plank 12, a bottom pad 72 which is positioned over the bottom of the plank 12, and a top pad 74 which is positioned over the top of the plank 12. The top and bottom pads 74, 72 extend essentially perpendicular from the center pad 70.

In the operation of the invention, soft pads, which are made of a material which is softer than the material of the horizontal run area 30 and vertical rise area 26 of the stairway 27 and of any walls beside the stairway 27, are used to protect the stairway 27 and the walls from any damage, such as scratching or marring, when the work platform 10 is rested on a stair 37. For instance, the pads may be made from PVC or similar material, are mounted on the ends and legs of an adjustable work platform 10. These pads protect the horizontal run area 30 and vertical rise area 26 of a stairway's steps 22 from damage when the user has positioned the adjustable work platform 10 on the stairway 27 to form a level standing surface because it is only the pads of the work platform 10 which contact the horizontal run area 30 and vertical rise area 26 of the stairway's steps 22. Also, the pads provide additional contact friction between the work platform 10 and the stairway 27 which keep the work platform 10 from shifting around while in use. In this way, besides protecting the horizontal run area 30 and vertical rise area 26 of the stairway 27 and any walls beside the stairway 27 from damage, the pads also act as treads to provide better gripping of the contact surface between the pads and the stairway 27 through additional contact friction.

FIGS. 1A-1D show the work platform 10 with the leg assemblies in the fully open position. The leg assemblies are shown fully extended.

FIG. 2 shows the location of pads on the work platform 10. The end pads 24 are attached to the ends of the plank 12 of the work platform 10, two total, one end pad 24 for each end. The bottom pads 72 are attached to the upper ends of the leg assemblies, four total, one bottom pad 72 attached to the upper end of each leg of the two leg assemblies. The end pads 24 and the bottom pads 72 are placed on the plank 12 and leg assemblies so that when the work platform 10 is in the stairway 27 mode, the pads on the side of the plank 12 which has the leg assembly in the closed position are the only portions of the work platform 10 which contact the vertical rise area 26 or horizontal run area 30 associated with the stairway 27. In an alternative embodiment, multiple separate pads instead of a single end pad 24 which extends along at least a portion of the end of the work platform 10, and preferably along the entire length of the end of the work platform 10, may be placed on the end of the work platform 10. Similarly, the bottom pads 72, which may be one continuous piece, or may be separate pieces of pad can be selectively positioned as desired along the bottom of the leg which contacts the horizontal run area 30 of the step 22, and as separate pieces of pad along the first and second sides of the leg which may contact the first and second walls, respectively, with no pad on the first or second inside of the leg. If desired, there may even be no pad placed on the first and second sides of the leg. If desired, attached to the bottom of each leg may be a foot 19 and additional steps. The plank 12 may have a handle 17 at its center. The plank 12 is preferably completely flat so a user standing on the plank 12 will not trip and fall over something sticking up from the plank 12.

FIG. 3 shows the work platform 10 in stairway 27 mode. One leg assembly is folded so the associated end of the work platform 10 with the folded leg assembly may safely be positioned on a horizontal run area 30 of the stairway 27 and the other open leg assembly is extended to a position which makes the plank 12 level.

Figure 4B:
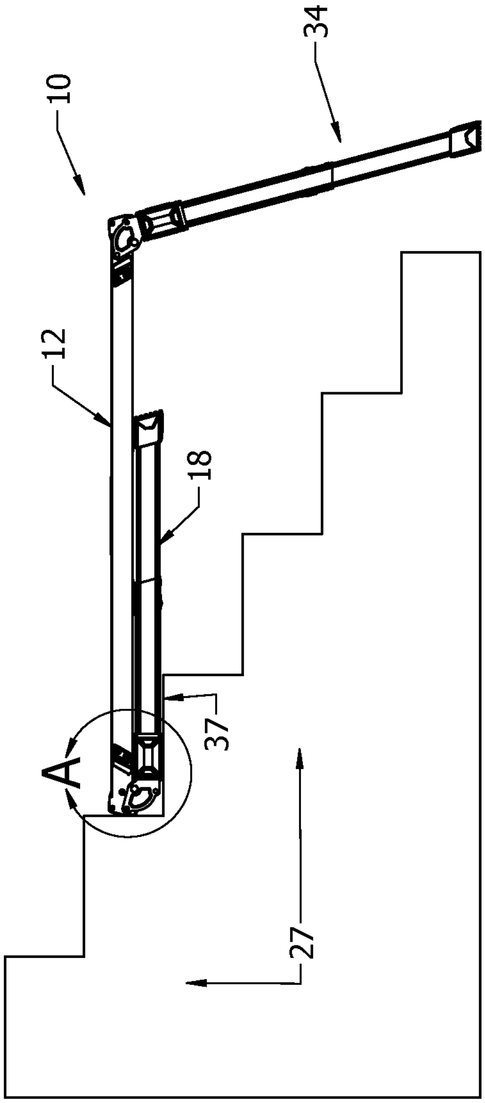
FIGS. 4A and 4B show how the pads are in contact with the stairway.
Figure 4A:
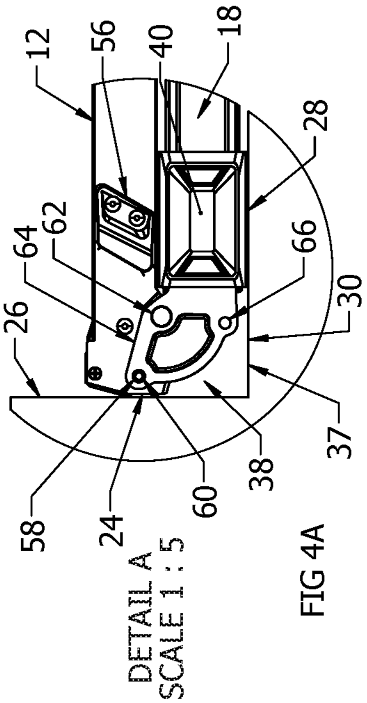
Figures 5A, 5B, 5C, 5D:
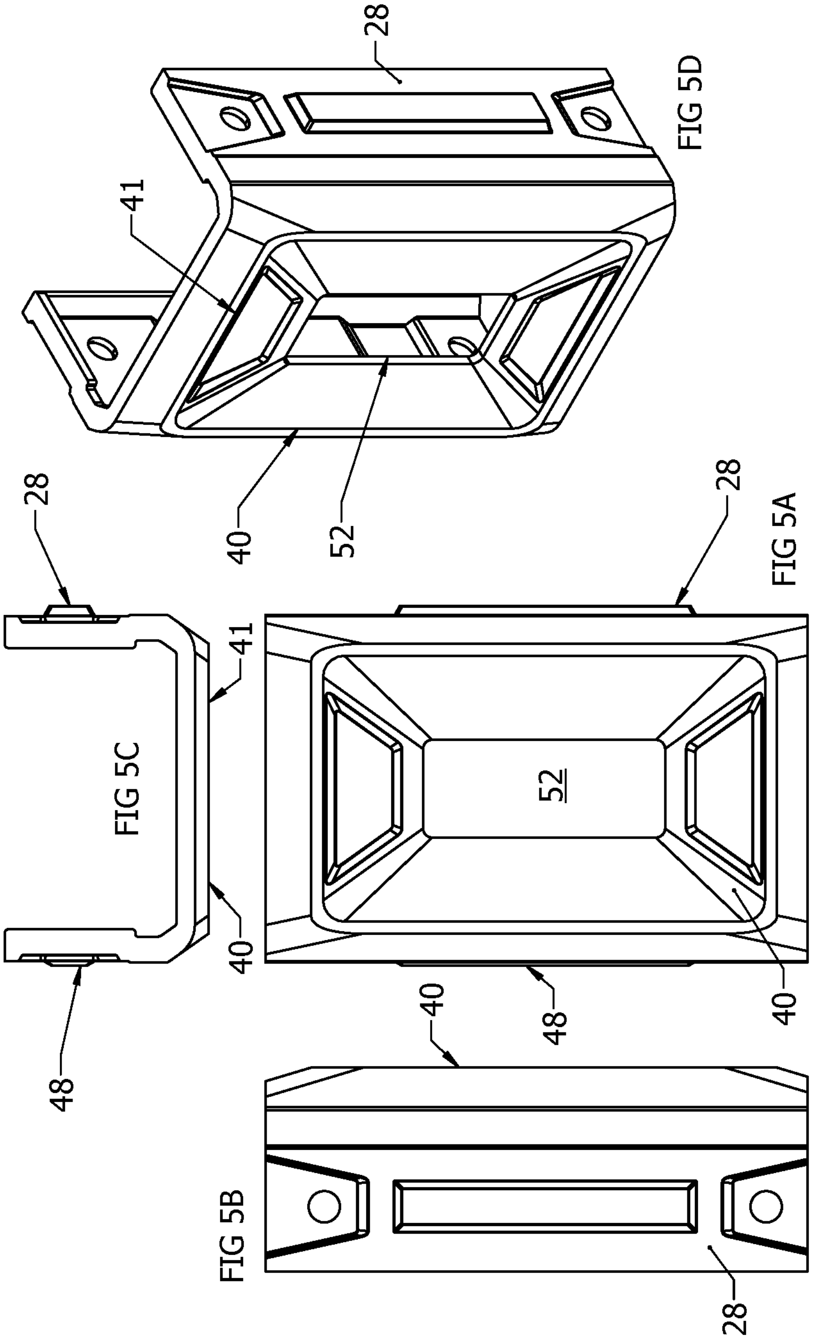
FIGS. 5A-5D show a side-bottom pad.
Figures 6A, 6B, 6C, 6D:
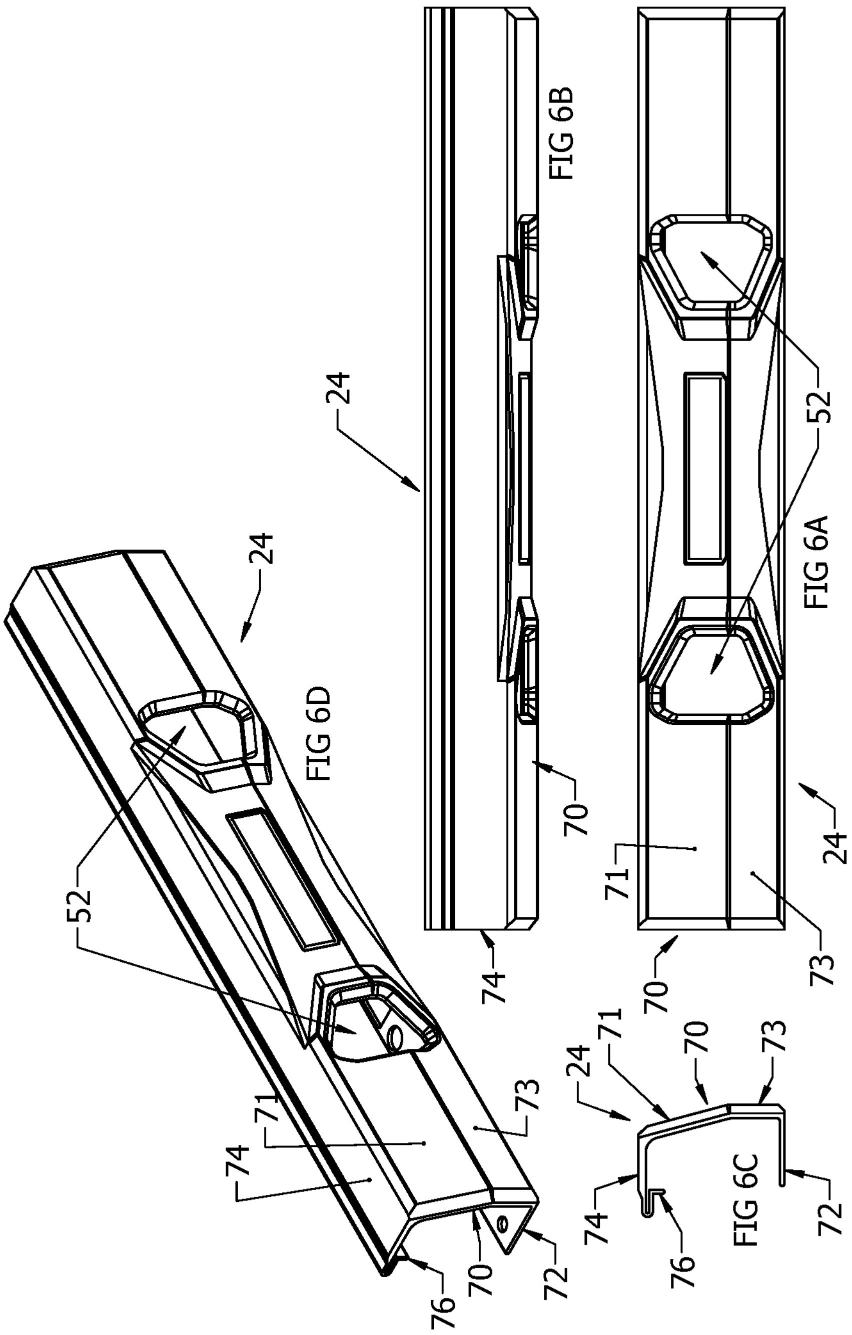
FIGS. 6A-6D show an end pad.

FIGS. 4A and 4B show how the pads are in contact with the stairway 27. The end pad 24 prevents damage to the vertical rise area 26 of the stairway 27. The bottom pad 72 prevents damage to the horizontal run area 30 of the stairway 27 while supporting the weight of the user. Though not shown, the side pads which are on the sides of the leg assemblies also prevent damage to walls which might be adjacent to the stairway 27. FIGS. 4A and 4B also show the hinge bracket 38. The hinge bracket 38 is used to directly rotatably attach each leg to the plank 12.

Figure 7:
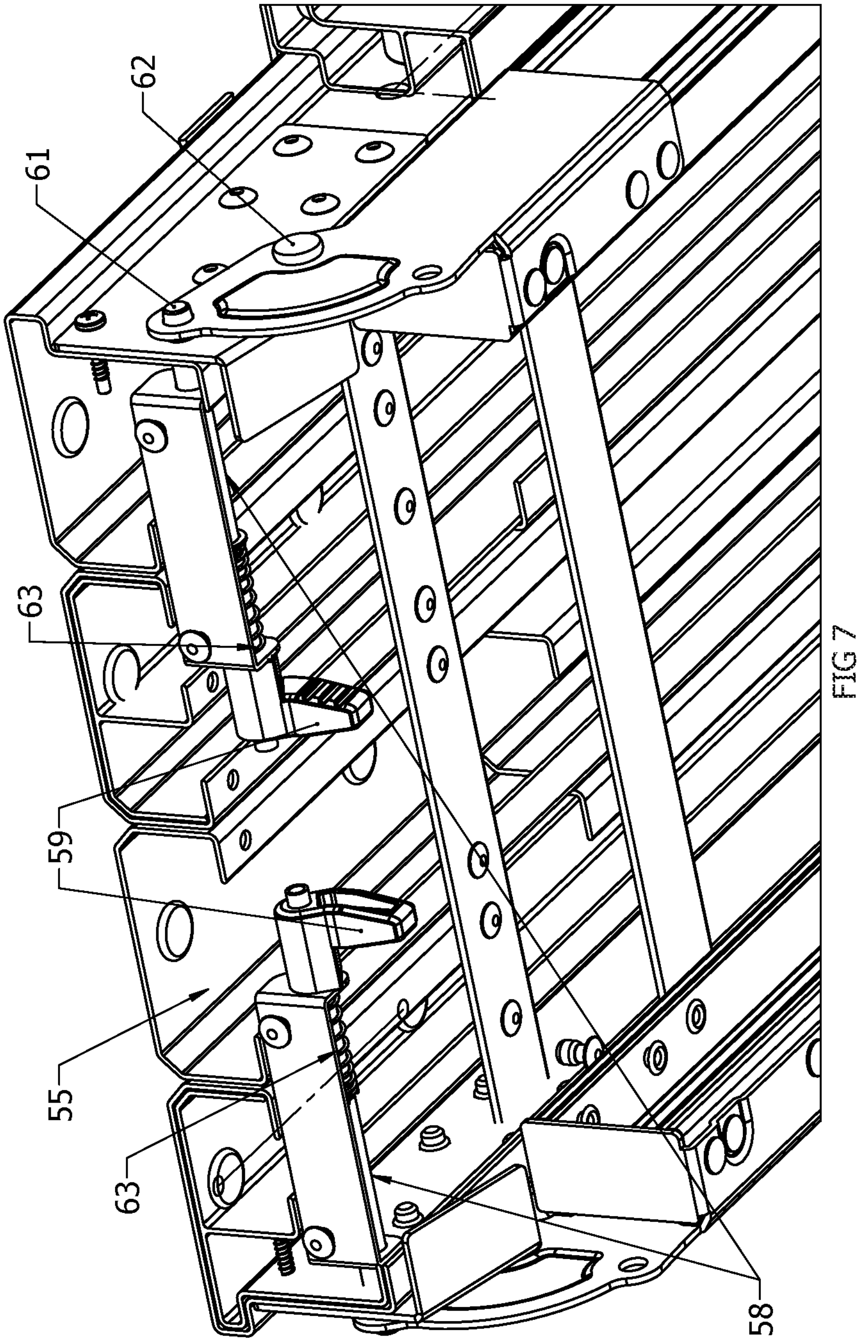
FIG. 7 shows an actuator for movement of the first leg assembly relative to the plank with the first leg assembly in the closed position.
Figure 8:
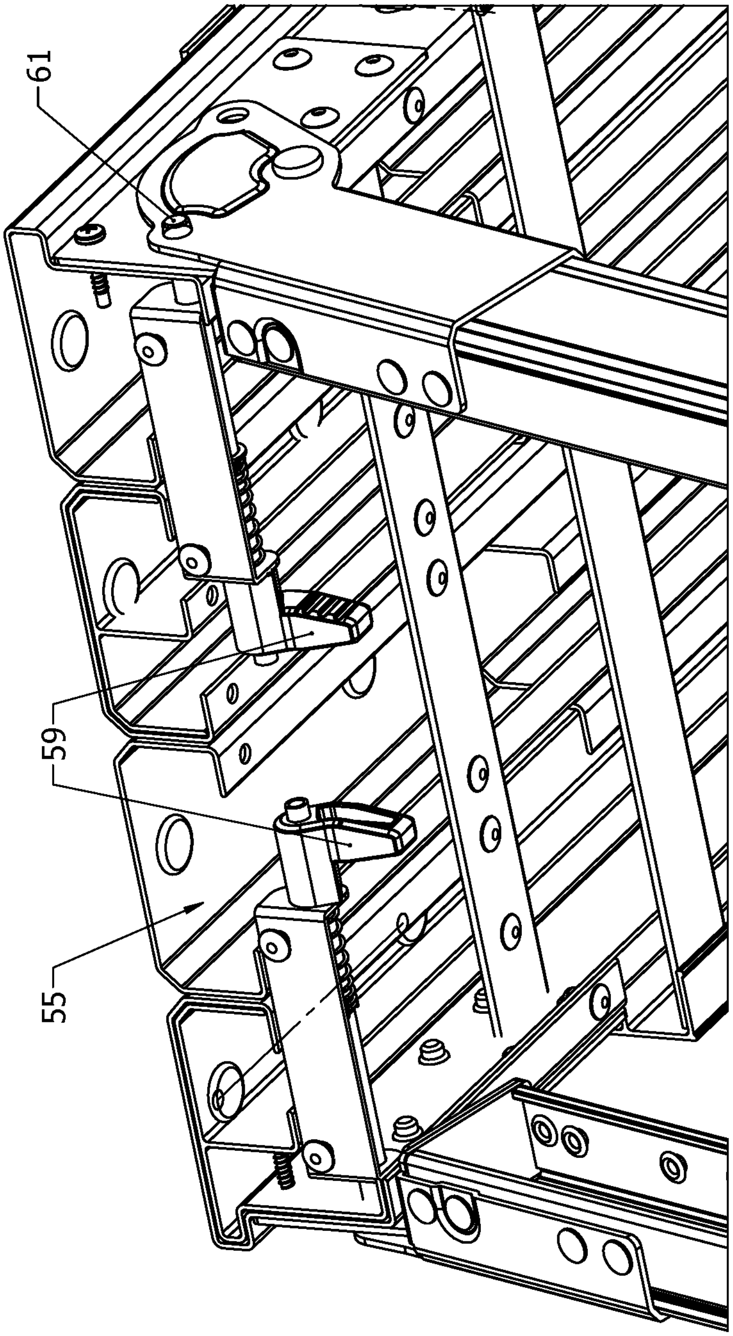
FIG. 8 shows the actuator for movement of the first leg assembly relative to the plank with the first leg assembly in the open position.
Figure 9:
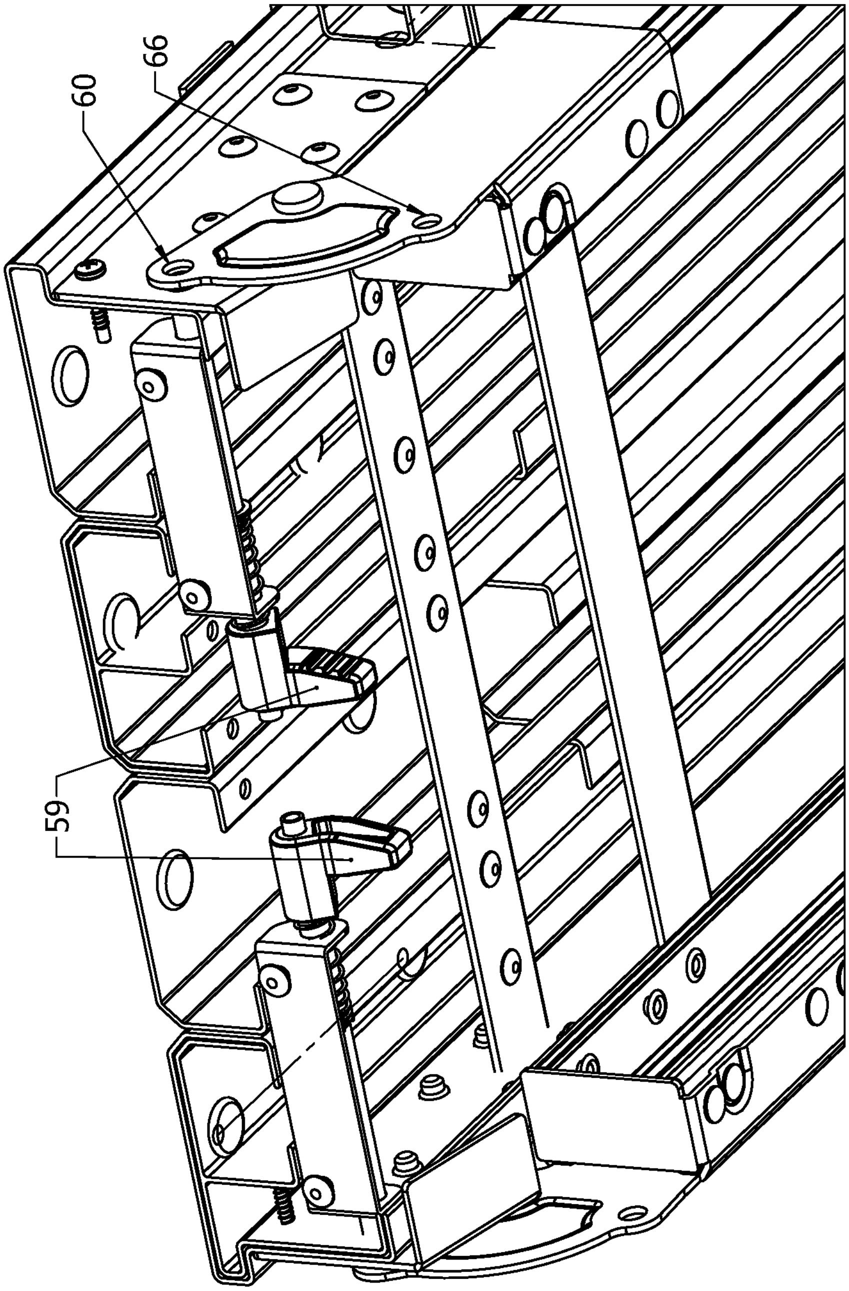
FIG. 9 shows the handles of the actuator hinged together so the plunger tip is disengaged from the hinge bracket.

The operation of the hinge bracket 38 is shown in FIGS. 4A, 4B, 7, 8 and 9. Movement of an actuator 55, as shown in FIG. 9, causes a plunger tip 61 of a plunger 58 to recede out of a first hole 60 of the hinge bracket 38, allowing the hinge bracket 38 to now rotate about a rotation bolt 62. The rotation bolt 62 rotationally attaches the hinge bracket 38 to the plank 12. The hinge bracket 38 is also attached to the first leg 18 so rotation of the hinge bracket 38 also results in rotation of the first leg 18 about the rotation bolt 62. When the plunger tip 61 of the plunger 58 recedes out of the first hole 60, the first leg 18 is able to rotate from a closed position, as shown in FIGS. 4A and 4B and 7, to the open position, as shown in FIG. 8. In the open position, an inside face 64 of the hinge bracket 38 contacts a stop 56, which prevents the hinge bracket 38 from further rotation, and also causes a second hole 66 to align with the plunger 58. The plunger tip 61 now moves out into the second hole 66 to lock the hinge bracket 38 in the open position, as shown in FIG. 8. To allow the hinge bracket 38 to rotate back to the closed position, the actuator 55 is squeezed to cause the plunger tip 61 to recede out of the second hole 66 so the hinge bracket 38 rotates until the first leg 18 contacts the stop 56, preventing the first leg 18 from further rotation. When the first leg 18 is in contact with the stop 56, the first hole 60 is in alignment with the plunger 58, so the plunger tip 61 now moves out into the first hole 60 to lock the hinge bracket 38 in the closed position under the action of a spring 63 biasing the plunger 58 to the closed position, as shown in FIG. 7. The spring 63 is positioned about the plunger 58. The actuator 55 is comprised of two handles 59, which went squeezed together, cause the plunger tip 61 to which they are attached to recede from whichever bracket hole they are in. The hinge bracket 38 on each of the other legs operates the same way. This is but one example of a hinge bracket 38 and actuator 55, which rotatably attaches the leg to the plank 12. Other types of hinge brackets and actuators may also be used.

FIGS. 5A-5D show a leg pad 41. This part can be molded of PVC or a similar resilient material. It is attached to the leg assembly by rivets through the four holes which are visible. Alternatively, the C-shaped cross-section of the leg pad 41 can have an edge 76 extending inwards from each side pad or flange of the leg pad 41 that grips and mechanically interlocks the leg and creates a friction fit to hold the leg pad 41 two the first leg 18. As shown, the leg pad 41 can have a C-shaped cross-section that is one continuous piece, formed of a bottom pad 28 which is positioned over the bottom of the first leg 18, a first side pad 40 which is positioned over the first side of the first leg 18, and a first inside pad 48 which is positioned over the first inside pad 48 of the first leg 18. The first bottom pad 28 and the first inside pad 48 extend essentially perpendicular from the first side pad 40. An edge 76 may extend from the top of the first pad inwards to facilitate the mechanical interlock with the first leg 18. There may be windows 52 in the first side pad 40 to allow visibility of the first leg 18, as well as for weight reduction, and thicker regions to provide for more padding at desired locations of the pad. Another leg pad 41 can be applied to the second leg 20. The bottom pad 28, the first inside pad 48 in the first side pad 40 may be separate and apart from each other and attached individually with rivets or adhesive to the leg. The thickness of the pads should be large enough to ensure that any rivets or parts of the leg or the plank are separated enough so that any rivets or parts of the leg where the plank will not contact any aspect of the stair upon which the end of the work platform rests or adjoining walls.

FIGS. 6A-6D show an end pad 24. This part can be molded of PVC or a similar resilient material. It is attached to the plank 12 by rivets on its underside and by mechanical interlocking on its top side. As shown, the end pad 24 can have a C-shaped cross-section that is one continuous piece, formed of a center pad 70 which is positioned over the center of the plank 12, a lower pad 72 which is positioned over the bottom of the plank 12, and a top pad 74 which is positioned over the top of the plank 12. The top and lower pads 74, 72 extend essentially perpendicular from the center pad 70. An edge 76 may extend from the top of the top pad 74 inwards to facilitate the mechanical interlock with the plank 12. The lower pad 72 has rivet holes through which the lower pad 72 is riveted to the plank 12. There may be windows 52 in the end pad 24 to allow visibility of the end of the plank 12 itself and weight reduction, as well as thicker regions to provide for more padding at desired locations of the end pad 24. To facilitate the end pad 24 properly contacting the vertical run area of the stair 37, as shown in FIG. 4A, the center pad 70 is formed preferably of an upper portion 71 and a lower portion 73 to properly cover the end of the plank. The upper portion 71 angles inwards from the lower portion 73 when the center portion contacts the vertical run area of the stair 37. This is to ensure the lower portion 73 contacts the vertical run area of the stair 37, with the upper portion 71 angling away from the vertical run area of the stair 37 and creating a gap between the upper portion 71 and the vertical run area of the stair 37. If the end of the plank is completely flat, then the center pad 70 can be completely flat and does not need an upper portion 71 in a lower portion 73. Basically, the end pad is configured to fit over the end of the plank, and protect the vertical run of the stair from being damaged or scratched or marred by the end of the plank. The end pad 24 maybe comprised of only the center pad 70, or the center pad 70 and the bottom pad 72, or the center pad 70 and the top pad 74, or all three. The center pad 70, the bottom pad 72 in the top pad 74 may also be individual and separate from each other, and individually riveted or attached to the end of the plank.

The legs of each assembly are adjustable to allow the height of the plank to be chosen as desired, or to better fold up in the stowed. There may be a handle under the middle step which has tips extending out either side to extend into desired holes in a lower portion of the legs to lock the lower portion of the legs at a desired height. If the handle is pulled, the tips or cause to recede from the holes in the lower portion of legs, allowing the lower portion of legs to be moved up into the upper portion of the legs, or extended further down from the upper portion of the legs, as is well known in the art. Instead of a handle having tips, separate latches or plugs may be used to extend into or removed out of the desired holes in the legs.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A stairway work platform for a user comprising:
- a plank extending longitudinally between a first end and a second end;
- a first leg assembly attached in proximity to the first end of the plank, the first leg assembly having a first leg and a second leg opposite the first leg, and a step attached to the first and second legs;
- an end pad permanently attached to the first end of the plank, the end pad including a top section, a bottom section, and a middle section covering a top portion, a bottom portion, and a side portion of the first end of the plank, the end pad molded of a material to prevent damage to a vertical rise area of the stairway;
- a first bottom pad attached to a front of the first leg which prevents damage to a horizontal run area of the stairway while supporting a weight of the user;
- a second bottom pad attached to a front of the second leg which prevents damage to the horizontal run area of the stairway while supporting the weight of the user;
- a second leg assembly attached in proximity to a second end of the plank, the second leg assembly extendible to adjust a length of the second leg assembly; and
- a hinge bracket attached to the plank in proximity to the first end of the plank and to the first leg of the first leg assembly, the first leg rotatable relative to the plank with the hinge bracket between a closed position and an open position, wherein in the closed position the first leg is parallel to and extends along an underside of the plank with the first end of the plank extending longitudinally beyond the first leg and the first bottom pad, and wherein in the open position the first leg forms an angle between 90 degrees and 145 degrees with the plank;
- the stairway work platform configurable to a stairway mode, wherein in stairway mode the first leg assembly is in the closed position to position the first end of the plank on a stair of the stairway such that at least a portion of the first bottom pad and second bottom pad rest on the horizontal run area of the stair and at least a portion of the end pad on the first end of the plank contacts the vertical rise area of the stair and the length of the second leg assembly is adjusted to a position which makes the plank level with respect to ground.

2. The stairway work platform of claim 1 including a first side pad attached to a side of the first leg which prevents damage to a right wall which is adjacent to the stairway, and a second side pad attached to a side of the second leg which prevents damage to a left wall which is adjacent to the stairway when the platform is in the stairway mode.

3. The stairway work platform of claim 2 wherein the first side pad and the first bottom pad are one continuous piece and the second side pad and the second bottom pad are one continuous piece.

4. The stairway work platform of claim 3 wherein the first side pad and the first bottom pad, and the second side pad and the second bottom pad provide padding to inhibit damage to the stairway or the first wall and the second wall when the platform is in the stairway mode.

5. The stairway work platform of claim 4 wherein the first side pad and the first bottom pad, and the second side pad and the second bottom pad have an L-shaped cross section, which covers the bottom and the right side and the bottom and the left side of the first leg and the second leg, respectively.

6. The stairway work platform of claim 5 including a first inside pad connected to and extending from the first bottom pad with the first inside pad and the first bottom pad and the first side pad having a C-shaped cross-section and being one continuous piece, and including a second inside pad connected to and extending from the second bottom pad with the second inside pad and the second bottom pad and the second side pad having a C-shaped cross-section and being one continuous piece.

7. The stairway work platform of claim 1 wherein the end pad, the first bottom pad, and the second bottom pad of the platform space the plank and the first leg assembly from contact with the horizontal run area and vertical rise area of the stairway's steps in the stairway mode.

8. The stairway work platform of claim 1, wherein the middle section of the end pad has a region of increased thickness.

9. The stairway work platform of claim 1, wherein the end pad includes at least one window.

10. The stairway work platform of claim 1, wherein the end pad has a C-shaped cross-section, the end pad receiving at least a portion of the first end of the plank.

11. The stairway work platform of claim 1, wherein at least a portion of the end pad includes a hook portion to secure the end pad to the plank.

12. The stairway work platform of claim 1, wherein the end pad is formed of PVC.

13. The stairway work platform of claim 1 wherein the middle section of the end pad includes a lower end surface and an upper end surface, the upper end surface extending obliquely to the lower end surface.

14. The stairway work platform of claim 1 wherein the top section of the end pad includes a hook portion to secure the top section to the plank and the bottom section of the end pad is secured directly to the plank with fasteners.

15. The stairway work platform of claim 14 wherein the hook portion of the top section clips the top section to the plank to attach the end pad to the plank.

16. The stairway work platform of claim 1 wherein the first bottom pad has a thickness sized to space fasteners extended therethrough from contact the horizontal run area of the stairway.

17. The stairway work platform of claim 1 further comprising an actuator at the bottom section of the end pad, the actuator operable to unlock the hinge bracket to permit the first leg assembly to rotate relative to the plank.

18. The stairway work platform of claim 17 wherein the actuator includes a first handle and a second handle to be urged together to permit the first leg assembly to rotate relative to the plank.

19. A stairway work platform comprising:

a plank;

a first leg assembly including a first leg and a hinge, the first leg attached in proximity to a first end of the plank with the hinge such that the first leg is pivotable relative to the plank with the hinge between a closed position and an open position; and a leg pad attached to a portion of the first leg adjacent the hinge with fasteners, the leg pad including:

a first side pad;

a first bottom pad extending perpendicularly from the first side pad and having a region of increased thickness; and a first inside pad extending perpendicularly from the first side pad, with the first side pad between the first bottom pad and the first inside pad and the first bottom pad in parallel with the first inside pad, the first inside pad contacting an underside of the plank when the first leg is in the closed position, wherein the first side pad, first bottom pad, and first inside pad are molded as one continuous piece, the leg pad molded of a material to provide padding to the first leg to inhibit damage to a surface.

20. The stairway work platform of claim 19, wherein the first side pad includes a window.

21. The stairway work platform of claim 19, wherein the first side pad has a region of increased thickness.

22. The stairway work platform of claim 21 wherein the region of increased thickness of the first side pad extends about a window of the first side pad.

23. The stairway work platform of claim 19, wherein the first bottom pad and the first inside pad include attachment openings through which fasteners extend to secure the leg pad to the leg of the work platform.

24. The stairway work platform of claim 19 wherein the leg pad is molded of PVC.

25. The stairway work platform of claim 19 wherein the first bottom pad includes one or more recessed portions, the one or more recessed portions each defining an attachment opening through which a fastener is able to be extended to secure the leg pad to the leg of the work platform.

26. A stairway work platform for a user comprising:

a plank extending longitudinally between a first end and a second end;

an end pad fixedly attached to the first end of the plank with fasteners, the end pad including a middle section and a bottom section to cover a side portion and bottom portion of the first end of the plank, the end pad molded of a material to prevent damage to a vertical rise area of the stairway;

a first leg assembly having a first leg, a second leg, and a step attached to the first leg and second leg;

a leg pad attached to the first leg;

a hinge connecting the first leg of the first leg assembly to plank at the first end of the plank, the hinge permitting the first leg to be pivoted relative to the plank between a closed position and an open position, wherein in the closed position the first leg extends longitudinally along an underside of the plank and parallel to a side of the plank, and wherein in the open position the first leg extends away from the plank;

a second leg assembly attached to the plank at a second end of the plank, the second leg assembly extendible to adjust a length of the second leg assembly; and the stairway work platform configurable to a stairway mode where the first leg assembly is in the closed position to permit the first end of the plank to be positioned on a stair of the stairway with the end pad inhibiting direct contact between the first end of the plank and the vertical rise area of the stair to prevent damage to the vertical rise area of the stairway and the leg pad inhibiting direct contact between the first leg and the stairway, wherein in the stairway mode the length of the second leg assembly is adjusted to a position to set an angle of the plank with respect to the ground.

27. The stairway work platform of claim 26 wherein the leg pad includes a first bottom pad directly attached to the first leg to inhibit direct contact between the first leg and a horizontal run area of a stair when positioned on the stair in the stairway mode to prevent damage to the horizontal run area of the stair.

28. The stairway work platform of claim 26 wherein the leg pad includes a first side pad directly attached to the first leg to inhibit direct contact between the first leg and a wall of the stairway adjacent a stair when positioned on the stair in the stairway mode to prevent damage to the wall.

* * * * *